US012231328B2

(12) United States Patent
Padebettu et al.

(10) Patent No.: US 12,231,328 B2
(45) Date of Patent: Feb. 18, 2025

(54) STANDBY ACCESS GATEWAY FUNCTION SIGNALING FOR A DYNAMIC HOST CONFIGURATION PROTOCOL

(71) Applicant: Juniper Networks, Inc., Sunnyvale, CA (US)

(72) Inventors: Venkatesh Padebettu, Bangalore (IN); Kiran Kumar K, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 344 days.

(21) Appl. No.: 17/659,186

(22) Filed: Apr. 14, 2022

(65) Prior Publication Data

US 2023/0336467 A1    Oct. 19, 2023

(51) Int. Cl.
*H04L 45/24*       (2022.01)
*H04L 45/247*      (2022.01)
*H04L 45/42*       (2022.01)
*H04L 45/586*      (2022.01)
*H04L 61/5014*     (2022.01)

(52) U.S. Cl.
CPC .............. *H04L 45/42* (2013.01); *H04L 45/24* (2013.01); *H04L 45/247* (2022.05); *H04L 45/586* (2013.01); *H04L 61/5014* (2022.05)

(58) Field of Classification Search
CPC ....... H04L 45/42; H04L 45/24; H04L 45/247; H04L 45/586; H04L 61/5014; H04L 45/22; H04L 45/28; H04L 45/66; H04L 67/145; H04L 67/146; H04L 69/40; H04W 36/0033; H04W 36/0055
See application file for complete search history.

(56) References Cited

U.S. PATENT DOCUMENTS

2016/0285923 A1*   9/2016   Kodaypak ........... H04L 43/0817

OTHER PUBLICATIONS

Anonymous: "DHCP Leasequery Methods | Junos OS | Juniper Networks", Feb. 23, 2021, 50 pages, XP055975640, Retrieved from the Internet: URL:https://www.juniper.net/documentation/us/en/software/junos/subscriber-mgmt-sessions/topics/topic-map/dhcp-individual-bulkleasequery.html.

(Continued)

*Primary Examiner* — Abdulkader M Alriyashi
(74) *Attorney, Agent, or Firm* — Harrity & Harrity, LLP

(57) ABSTRACT

In some implementations, a first access gateway function (AGF) may receive, from a second AGF, a communication indicating at least one of a subscriber identity, session information, subscriber context, or session transport information associated with an active session between the second AGF and a client device. The first AGF device may detect that the second AGF device is associated with a failure. The first AGF device may transmit, to a first core network device, a request to switch a first path associated with the active session from the second AGF device to the first AGF device, wherein the request indicates at least one of the subscriber identity, the session information, the subscriber context, or the session transport information. The first AGF device may forward one or more data communications between a second core network device and the DHCP client device associated with the active session via a second path.

13 Claims, 9 Drawing Sheets

(56) References Cited

OTHER PUBLICATIONS

Anonymous: "M:N Subscriber Redundancy on BGP | Junos OS | Juniper Networks", Dec. 14, 2021, 45 pages, XP055975662, Retrieved from the Internet: URL:https://web.archive.org/web/20220121223305/https://www.juniper.net/documentation/us/en/software/junos/subscriber-mgmt-sessions/topics/topic-map/m-to-n-subscriber-redundancy.html.

Broadband Forum: "TR-456 AGF Functional Requirements", 3GPP Draft; S2-2006795, 3rd Generation Partnership Project (3GPP), Mobile Competence Centre ; 650, Route Deslucioles ; F-06921 Sophia-Antipolis Cedex; France No. 2020070122 Sep. 2020, XP051935382, Retrieved from the Internet: URL:https://ftp.3gpp.org/tsg_sa/WG2_Arch/TSGS2_141e_Electronic/Docs/S2-2006795.zip.

European Search Report for Application No. EP22175565.5, mailed on Nov. 7, 2022, 10 pages.

* cited by examiner

STANDBY ACCESS GATEWAY FUNCTION SIGNALING FOR A DYNAMIC HOST CONFIGURATION PROTOCOL

BACKGROUND

The Dynamic Host Configuration Protocol (DHCP) is a network management protocol used on Internet Protocol (IP) networks for assigning IP addresses and other communication parameters to devices connected to the network using a client—server architecture. A DHCP server is a network server that automatically provides and assigns IP addresses, default gateways, and other network parameters to client devices. In some cases, an access gateway function (AGF) of a network may serve as a DHCP relay between a client device and the DHCP server.

SUMMARY

Some implementations described herein relate to a method. The method may include communicating, by a first access gateway function (AGF) device, with a first core network device to establish a network connection with a core network. The method may include receiving, by the first AGF device and from a second AGF device, a communication indicating at least one of a subscriber identity, session information, subscriber context, or session transport information associated with an active session between the second AGF device and a dynamic host configuration protocol (DHCP) client device. The method may include detecting, by the first AGF device, that the second AGF device is associated with a failure for the active session between the second AGF device and the DHCP client device. The method may include transmitting, by the first AGF device and to the first core network device, a request to switch a first path associated with the active session from the second AGF device to the first AGF device, wherein the request indicates at least one of the subscriber identity, the session information, the subscriber context, or the session transport information. The method may include receiving, by the first AGF device and from the first core network device, an indication of information associated with a second path between a second core network device and the first AGF device for the active session associated with the DHCP client device. The method may include forwarding, by the first AGF device, one or more data communications between the second core network device and the DHCP client device associated with the active session via the second path.

Some implementations described herein relate to a first access gateway function (AGF) device. The first access gateway function (AGF) device may include one or more memories and one or more processors. The one or more processors may be configured to establish, with a control plane core network device, a network connection with a core network. The one or more processors may be configured to establish, with the control plane core network device, a protocol data unit (PDU) session associated with a client device via a dynamic host configuration protocol (DHCP), wherein the PDU session is associated with at least one of a subscriber identity associated with the client device, session information, subscriber context, or session transport information. The one or more processors may be configured to forward one or more data communications, associated with the PDU session, between the client device and a user plane core network device. The one or more processors may be configured to transmit, to a second AGF device, a lease query communication indicating at least one of the subscriber identity, the session information, the subscriber context, or the session transport information associated with the PDU session to enable the second AGF device to maintain the PDU session with the client device.

Some implementations described herein relate to a non-transitory computer-readable medium that stores a set of instructions for a first access gateway function (AGF) device. The set of instructions, when executed by one or more processors of the first AGF device, may cause the first AGF device to communicate with a control plane core network device to establish a network connection with a core network. The set of instructions, when executed by one or more processors of the first AGF device, may cause the first AGF device to receive, from a second AGF device, a lease query communication indicating at least one of a subscriber identity, session information, subscriber context, or session transport information associated with a protocol data unit (PDU) session between the second AGF device and a client device. The set of instructions, when executed by one or more processors of the first AGF device, may cause the first AGF device to detect that the second AGF device has experienced a failure associated with the PDU session. The set of instructions, when executed by one or more processors of the first AGF device, may cause the first AGF device to transmit, to the control plane core network device, a request to switch the PDU session from the second AGF device to the first AGF device, wherein the request indicates at least one of the subscriber identity, the session information, the subscriber context, or the session transport information. The set of instructions, when executed by one or more processors of the first AGF device, may cause the first AGF device to receive, from the control plane core network device, an indication of information associated with a path between a user plane core network device and the first AGF device for the PDU session associated with the client device. The set of instructions, when executed by one or more processors of the first AGF device, may cause the first AGF device to forward one or more data communications between the user plane core network device and the client device associated with the PDU session via the path.

DETAILED DESCRIPTION

Figure 1A:
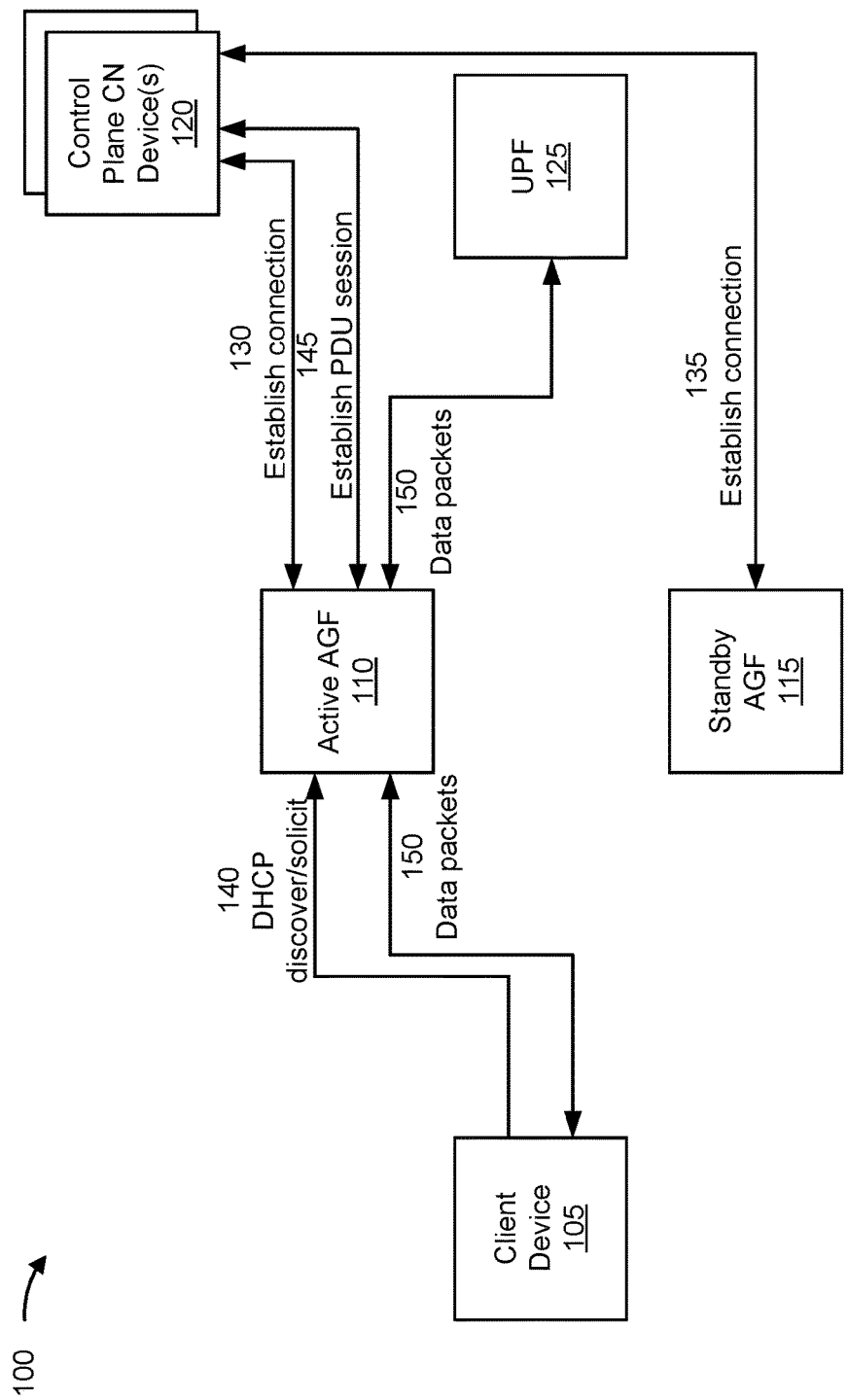
FIGS. 1A-1C are diagrams of an example implementation described herein.

The following detailed description of example implementations refers to the accompanying drawings. The same reference numbers in different drawings may identify the same or similar elements.

A Dynamic Host Configuration Protocol (DHCP) relay may forward communications between a client device and a DHCP server. For example, in some deployments, an access gateway function (AGF) device may be, or may act as, the DHCP relay. The AGF device may provide access for client devices to a wireless core network (e.g., a 5G core network). For example, an AGF device may provide connectivity to the wireless core network for client devices that support non-access stratum (NAS) signaling and client devices that are purely wireline (e.g., where transmission of information occurs over a physical element, such as a fiber optic able, a coaxial cable, a twisted pair cable, and/or the like). In such examples, the DHCP server may be a user plane function (UPF) device associated with the wireless core network and/or a session management function (SMF) device associated with the wireless core network. The AGF device may forward DHCP communications (e.g., to establish an active session) and/or data packets (e.g., associated with an active session) between the client device and the UPF device to facilitate connectivity for the client to the wireless network (e.g., the 5G network).

However, in some cases, the AGF device serving as the DHCP relay for the client device may fail. For example, a connection between the AGF device and the client device (e.g., between the AGF device and an access network associated with the client device) and/or the AGF device itself may experience a failure (e.g., a software failure and/or a hardware failure). In some cases, a detection of the failure associated with the AGF device may be associated with a significant delay or latency (e.g., because the detection may be based on a DHCP renew procedure which may require the client device to send a DHCP request to the AGF device to enable the client device to detect that the connection with the AGF device has failed).

Additionally, in some cases, a second AGF device (e.g., a standby AGF device) may be available to serve as the DHCP relay for the client device. However, to establish a connection with the second AGF device, the active session associated with the client device and a first AGF device may be terminated, and the client device may be required to establish a new session with the second AGF device. In other words, to switch a connection to the second AGF device after a failure associated with the first AGF device, a new DHCP establishment procedure and/or a new protocol data unit (PDU) session establishment procedure may need to be performed in order to establish a connection between the client device and the wireless network. This consumes significant network resources associated with the exchange of multiple messages between the client device and the second AGF device, between the second AGF device and one or more core network devices, and/or between different core network devices associated with establishing a new session for the client device. Further, because the previous session associated with the client device is terminated, information associated with the previous session may be lost. For example, the new session with the second AGF device may be associated with a new Internet Protocol (IP) address, and/or other network parameters or identifiers that are different than the previous session. Additionally, establishing a new session associated with the second AGF device may be associated with a significant delay associated with the signaling required to establish the new session. As a result, the client device may be unable to access the wireless network during the delay, resulting in degraded performance associated with the client device.

Some implementations described herein enable standby AGF signaling for a DHCP to enable a handover from a first AGF device to a second AGF device for a client device without terminating a PDU session associated with the client device and/or without establishing a new DHCP connection and/or PDU session. For example, the first AGF device may serve as a DHCP relay for a client device (e.g., may be an active AGF device). The second AGF device may be a standby AGF device. The first AGF device may transmit, and the second AGF device may receive, a communication (e.g., a lease query communication) indicating a subscriber identity, session information, subscriber context, and/or session transport information associated with an active session between the first AGF device and the client device, among other examples. In other words, the first AGF device may provide information to the second AGF device to enable the second AGF device to indicate to the core network (e.g., to a control plane core network device) to switch a connection to the UPF of the core network for the client device from the first AGF device to the second AGF device. For example, the information (e.g., the subscriber identity, the session information, and/or the session transport information) may enable the second AGF device to identify and indicate (e.g., to the core network) the client device and/or transport information associated with the active session of the client to device. For example, the information may be information to establish the active session associated with the client device that is generated by the first AGF device (e.g., NAS information) and/or that is provided by the core network to the first AGF device.

By providing such information to the second AGF device (e.g., the standby AGF device), the second AGF device may be enabled to transmit, to the core network, an indication to switch a first path associated with the active session of the client device from the first AGF device to the second AGF device upon detecting a failure associated with the first AGF device. The core network may modify session information associated with the active session to switch the path to the second AGF device.

As a result, signaling required to establish (e.g., re-establish) a connection for the client device with the second AGF device after a failure associated with the first AGF device may be significantly reduced, thereby conserving network resources and/or processing resources that would have otherwise been used to establish a new DHCP session and/or a new PDU session associated with the client device. Therefore, the active session associated with the client device may be maintained and the client device may experience no, or a minimal, impact (e.g., on data rates or data connectivity) due to the failure of the first AGF device. Additionally, a delay associated with switching a connection or path for connectivity to the wireless network for the client device from the first AGF device to the second AGF device may be reduced. Moreover, the second AGF device may be enabled to quickly detect (e.g., as compared to the client device detecting the failure) the failure associated with the first AGF device based on signaling exchanged between the first AGF device and the second AGF device (e.g., bidirectional forwarding detection (BFD) signaling or other signaling).

Figure 1B:
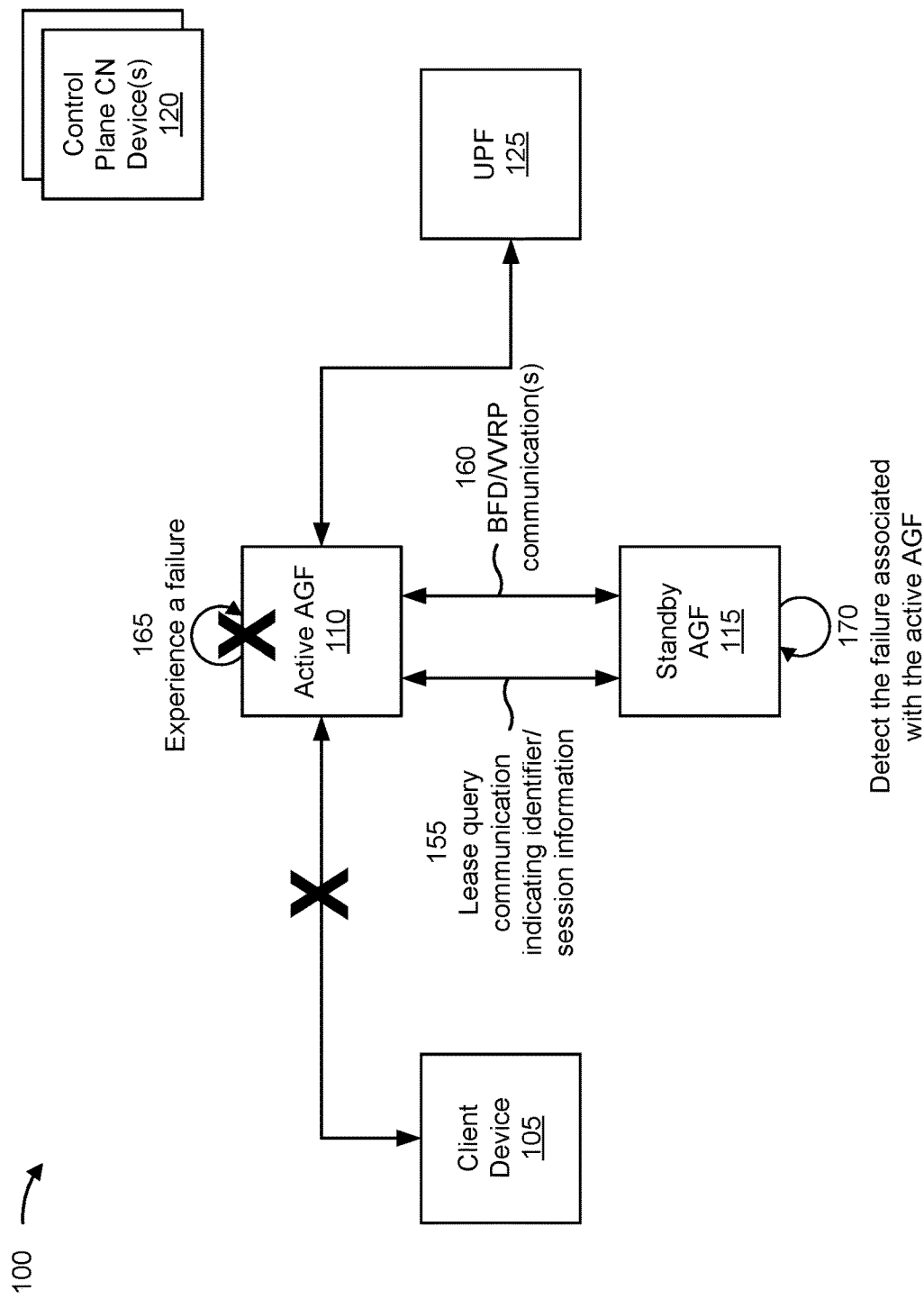
Figure 1C:
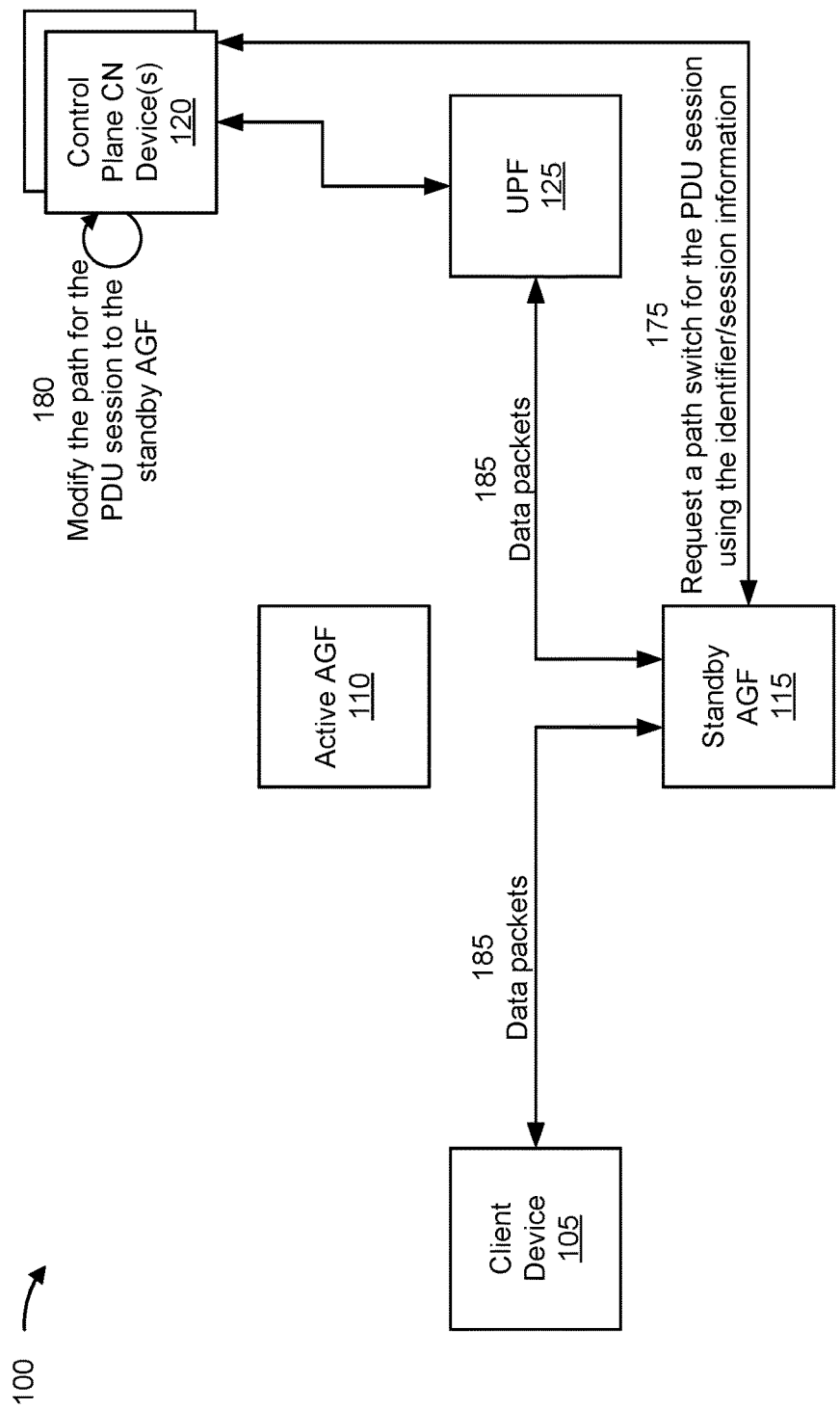

FIGS. 1A-1C are diagrams of an example implementation 100 associated with standby AGF signaling for a DHCP. As shown in FIGS. 1A-1C, example implementation 100 includes a client device 105, an active AGF 110 (e.g., an active AGF device), a standby AGF 115 (e.g., a standby AGF device), one or more control plane core network (CN) devices 120, and a UPF 125. These devices are described in more detail below in connection with FIGS. 2, 4 and 5. Although not shown in FIGS. 1A-1C, the active AGF 110 and the standby AGF 115 may be connected to the client device 105 via an access network (AN). As described in more detail elsewhere herein, the UPF 125 may serve as a DHCP server for the client device 105. In some other implementations, an SMF (not shown in FIGS. 1A-1C) may serve as the DHCP server in a similar manner as described herein.

As used herein, "active" and "standby," when used in connection with a particular AGF, refer to a status of a connection with the client device 105 (e.g., and not to a running state, configuration, or capability of the particular AGF). For example, the active AGF 110 and the standby AGF 115 may be similar devices and/or may be capable of performing similar, or the same, functions (e.g., the standby AGF 115 may be capable of performing operations or functions described herein in connection with the active AGF 110 and the active AGF 110 may be capable of performing operations or functions described herein in connection with the standby AGF 115).

The active AGF 110 and the standby AGF 115 may be DHCP relays for relaying communications between the client device 105 and the UPF 125 (e.g., the UPF 125 may provide access to a data network of a wireless network associated with the UPF 125). For example, the client device 105 may be any device that is capable of communicating via the DHCP. The DHCP may be associated with an IP version 4 (IPv4), which may be referred to as a DHCPv4, may be associated with an IP version 6 (IPv6), which may be referred to as a DHCPv6, or may be associated with another version of the DHCP.

The active AGF 110 and the standby AGF 115 may be deployed between a wireline access infrastructure and a wireless core network. Therefore, the active AGF 110 and the standby AGF 115 may support client devices 105 (such as residential gateways or other client devices) that support or include NAS signaling and client devices 105 that are purely wireline devices. This enables the wireless core network to provide services that may typically be associated with a wireline network.

As shown by reference number 130, the active AGF 110 may communicate, with the one or more control plane core network devices 120 to establish a connection with the core network. For example, the active AGF 110 may exchange one or more messages with an access and mobility function (AMF) of the core network to establish a connection with the core network. Similarly, as shown by reference number 135, the standby AGF 115 may communicate, with the one or more control plane core network devices 120 to establish a connection with the core network. For example, the standby AGF 115 may exchange one or more messages with the AMF of the core network to establish a connection with the core network.

For example, the active AGF 110 and the standby AGF 115 may perform a setup of an N2 interface (e.g., as defined by a standard, such as the Broadband Forum (BBF) and/or the Third Generation Partnership Project (3GPP)). The N2 interface may be an interface between a control plane of the core network (e.g., between the AMF of the core network) and the active AGF 110 or the standby AGF 115. For example, the active AGF 110 and the standby AGF 115 may establish the N2 interface, which may connect the active AGF 110 and the standby AGF 115 to the AMF of the core network, thereby enabling the active AGF 110 and the standby AGF 115 to access control plane services associated with the core network. This may enable the active AGF 110 and the standby AGF 115 to exchange control signaling with the core network (e.g., via the AMF).

As shown by reference number 140, the client device 105 may transmit, and the active AGF 110 may receive, a DHCP message requesting the initiation of a DHCP session. The DHCP message may be a DHCP session establishment request. For example, the client device 105 may transmit a request to establish a DHCP session with a DHCP server (e.g., the UPF 125). In some implementations, the DHCP request may be forwarded to the active AGF 110 via an AN. In some implementations, the DHCP request may include a DHCP discover message or packet (e.g., a DHCP discover query) and/or a DHCP solicit message or packet.

Based on receiving the DHCP request, the active AGF 110 may establish a PDU session associated with the client device 105. In some implementations, the active AGF 110 may generate NAS information to be associated with the PDU session and/or the client device 105. For example, the active AGF 110 may generate subscriber identity and/or session information to be associated with the PDU session and/or the client device 105. The information generated by the active AGF 110 may include a subscriber unique permanent identifier (SUPI) associated with the client device 105 and the session, a subscriber unique concealed identifier (SUCI) associated with the client device 105 and the session, a global unique temporary identifier (GUTI) associated with the client device 105 and the session, and/or a PDU session identifier, among other examples. The information generated by the active AGF 110 may be information associated with an N1 interface (e.g., as defined by the BBF and/or the 3GPP). For example, the N1 interface may be an interface associated with transferring information associated with the client device 105 to the control plane core network device(s) 120 (e.g., to the AMF of the core network).

As shown by reference number 145, the active AGF 110 and the control plane core network device(s) 120 (e.g., the AMF) may exchange one or more messages to establish a PDU session associated with the client device 105. For example, the active AGF 110 may transmit, to a control plane core network device 120 (e.g., the AMF), a PDU session establishment request. The PDU session establishment request may indicate the information generated by the active AGF 110. The control plane core network device(s) 120 may establish the PDU session based on the information provided by the active AGF 110. For example, an AMF may generate session transport information indicating a path or a tunnel to be used by the active AGF 110 to communicate with the UPF 125. For example, the AMF may generate next generation application protocol (NGAP) information associated with the PDU session. The information generated by the AMF may include a global unique AMF identifier (GUAMI) associated with the PDU session, an AMF user equipment (UE) NGAP identifier associated with the PDU session, a radio access network (RAN) UE NGAP identifier associated with the PDU session, and/or UE context information associated with the PDU session, among other examples. The control plane core network device 120 (e.g., the AMF) may transmit, to the active AGF 110, an indication of the information generated by the AMF. The active AGF 110 may use this information to communicate with the UPF 125 and/or to forward communications between the UPF 125 and the client device 105.

Based on establishing the PDU session, the client device 105 and the UPF 125 may exchange one or more communications to establish a DHCP session. For example, establishing the PDU session may enable the active AGF 110 to establish a connection (e.g., a path or tunnel) associated with the UPF 125 (e.g., for forwarding communication between the UPF 125 and the client device 105). For example, the UPF 125 may transmit a DHCP offer message or a DHCP advertise message indicating that the UPF 125 is available to serve as the DHCP server. The active AGF 110 may forward the DHCP offer message or the DHCP advertise message to the client device 105. The client device 105 may transmit a DHCP request message, in response to the DHCP offer message or the DHCP advertise message, requesting network configuration data, such as an IP address, among other examples. For example, the client device 105 may select the UPF 125 as the DHCP server to be associated with the client device 105. The client device may request a network configuration (e.g., via the DHCP request message), from the UPF 125, based on selecting the UPF 125 as the DHCP server. The client device 105 may broadcast the DHCP request message. The DHCP request message may include an IP address associated with the UPF 125 (e.g., indicating that the UPF 125 has been selected as the DHCP server for the client device 105). The active AGF 110 may forward the DHCP request message to the UPF 125.

Based on receiving the DHCP request message, the control plane CN device(s) 120 may generate network configuration information for the client device 105. For example, the control plane CN device(s) 120 may generate an IP address, a subnet mask, a default gateway IP address, a domain name system (DNS) server IP address, and/or a lease time (e.g., an amount of time that the network configuration information is valid for), among other examples. The network configuration information associated with the DHCP session may be referred to herein as "binding information." The control plane CN device(s) 120 may provide the generated network configuration information for the client device 105 to the UPF 125. The UPF 125 may transmit a DHCP acknowledgement (ACK) message indicating the network configuration information for the client device 105. The active AGF 110 may forward the DHCP ACK message to the client device 105. The client device 105 may receive and store the network configuration information. As a result, the client device 105 may establish a connection with a data network associated with the UPF 125.

For example, as shown by reference number 150, the active AGF 110 may forward one or more data communications (e.g., one or more data packets), associated with the PDU session and/or the DHCP session, between the client device 105 and the UPF 125. The UPF 125 may forward the one or more data communications to the data network.

As shown in FIG. 1B, the active AGF 110 and the standby AGF 115 may exchange one or more messages associated with the active session of the client device 105. For example, as shown by reference number 155, the active AGF 110 may transmit, and the standby AGF 115 may receive, a communication indicating the subscriber identity, the session information, and/or the session transport information associated with the active session (e.g., the PDU session and/or the DHCP session) between the active AGF 110 and the client device 105. The communication may be a lease query communication, such as an active lease query (ALQ) communication, a bulk lease query (BLQ) communication, and/or an individual lease query communication, among other examples.

For example, the active AGF 110 and the standby AGF 115 may establish a transmission control protocol (TCP) connection to exchange communications. In some implementations, the standby AGF 115 may transmit, and the active AGF 110 may receive, a lease query request (e.g., a BLQ request or an ALQ request) to request binding information (e.g., network configuration information) associated with one or more client devices, such as the client device 105. The active AGF 110 may transmit, and the standby AGF 115 may receive, the lease query communication indicating the binding information associated with the client device 105 (e.g., and one or more other client devices) via the TCP connection. For example, the binding information may include an identifier associated with the client device 105, a server identifier (e.g., a relay identifier) associated with the active AGF 110 (e.g., a relay identifier based on a link aggregation control protocol (LCAP) MAC address), an IP address associated with the client device 105, a lease time associated with the DHCP session, a subnet mask, a DHCP client time associated with the DHCP session, a DHCP base time associated with the DHCP session, and/or an interface identifier associated with the DHCP session, among other examples.

Additionally, the communication (e.g., the lease query communication) transmitted by the active AGF 110 to the standby AGF 115 may include information to enable the standby AGF 115 to switch a path (e.g., a path between the DHCP relay and the UPF 125) from the active AGF 110 to the standby AGF 115 in the event of a failure associated with the active AGF 110 (e.g., by communicating with the control plane core network device(s) 120). For example, the communication (e.g., the lease query communication) may include an indication of the subscriber identity, the session information, subscriber context, and/or the session transport information associated with the active session (e.g., the PDU session and/or the DHCP session) between the active AGF 110 and the client device 105. For example, the communication (e.g., the lease query communication) may include an indication of NAS information (e.g., generated by the active AGF 110) and/or NGAP information (e.g., provided by the control plane core network device(s) 120, such as the AMF) associated with the active session (e.g., the PDU session and/or the DHCP session) between the active AGF 110 and the client device 105. In some implementations, the communication (e.g., the lease query communication) may include an indication of a SUPI, a SUCI, a GUTI, and/or a PDU session identifier, among other examples, associated with the active session (e.g., the PDU session and/or the DHCP session) between the active AGF 110 and the client device 105. Additionally, or alternatively, the communication (e.g., the lease query communication) may include an indication of a GUAMI, an AMF UE NGAP identifier, a RAN UE GAP identifier, UE context information (e.g., PDU session information associated with the PDU session, and/or general packet radio service (GPRS) tunneling protocol (GTP) information associated with the PDU session), among other examples, associated with the active session (e.g., the PDU session and/or the DHCP session) between the active AGF 110 and the client device 105.

This information may enable the standby AGF 115 to request that the control plane core network device(s) 120, such as the AMF, switch a path associated with the active session from the active AGF 110 to the standby AGF 115. For example, the standby AGF 115 may be enabled to identify the subscriber identity, the session information, the subscriber context, and/or the session transport information associated with the active session to enable the standby AGF 115 to cause the path associated with the active session to be switched to the standby AGF 115, as described in more detail elsewhere herein.

As shown by reference number 160, the active AGF 110 and the standby AGF 115 may exchange one or more communication to enable the standby AGF 115 to detect a failure associated with the active AGF 110. For example, the active AGF 110 and the standby AGF 115 may exchange one or more virtual router redundancy protocol (VRRP) communications or one or more BFD communications to facilitate a detection of a failure associated with the active AGF 110 associated with the active session. For example, the active AGF 110 and the standby AGF 115 may utilize the VRRP to establish one or more redundant routing platforms (e.g., where the active AGF 110 and the standby AGF 115 are hosts associated with the VRRP). The active AGF 110 (e.g., as a primary host of the VRRP) may periodically transmit packets to the standby AGF 115 (and/or other hosts) to enable the standby AGF 115 to evaluate a health of the active AGF 110.

As another example, the active AGF 110 and the standby AGF 115 may exchange BFD communications. For example, the standby AGF 115 may periodically transmit, and the active AGF 110 may receive, a BFD packet (e.g., a BFD hello packet). The active AGF 110 may transmit, and the standby AGF 115 may receive, a BFD response indicating that the active AGF 110 is active and not experiencing a failure.

As shown by reference number 165, the active AGF 110 may experience a failure. For example, the failure may include an event or a condition that causes the active AGF 110 to lose a connection with the client device 105 and/or the UPF 125. As shown by reference number 170, the standby AGF 115 may detect that the active AGF 110 is associated with, or experiencing, the failure for the active session between the active AGF 110 and the client device 105. For example, the standby AGF 115 may detect the failure associated with the active AGF 110 based on determining that an amount of time, since transmitting a BFD or VRRP communication to the active AGF 110 without receiving a response (e.g., a BFD response packet or a VRRP response packet), satisfies a threshold. For example, the VRRP and/or the BFD protocol may enable the standby AGF 115 to detect the failure associated with the active AGF 110 based on not receiving a reply or a response from the active AGF 110 after a specified interval. In other words, the standby AGF 115 may detect that the active AGF 110 has experienced the failure based on performing a VRRP procedure and/or a BFD procedure with the active AGF 110, among other examples.

As shown in FIG. 1C, the standby AGF 115 may perform one or more actions to cause a path associated with the active session of the client device 105 to be switched from the active AGF 110 to the standby AGF 115 (e.g., to enable the client device 105 to maintain the active session and the connection with the data network). For example, as shown by reference number 175, the standby AGF 115 may transmit, to the control plane core network device(s) (e.g., to the AMF), a request to switch a first path associated with the active session from the active AGF 110 to the standby AGF 115. The request may be a path switch request (e.g., an NGAP path switch request), such as a path switch request as defined, or otherwise fixed, by the BBF and/or the 3GPP. In some implementations, the request may indicate information provided by the active AGF 110 (e.g., as described in connection with reference number 155). For example, the request indicates the subscriber identity, the session information, and/or the session transport information associated with the session (e.g., the PDU session and/or the DHCP session) between the active AGF 110 and the client device 105.

As shown by reference number 180, the control plane core network device (s) 120 may modify the path for the PDU session and/or the DHCP session to the standby AGF 115 (e.g., from the active AGF 110). For example, an AMF may request a session management function (SMF) to modify the path based on the information provided by the standby AGF 115 (e.g., in the path switch request). For example, the SMF may communicate with the UPF 125 to modify the path (e.g., a tunnel) associated with the PDU session from the active AGF 110 to the standby AGF 115.

The control plane core network device (s) 120 (e.g., the AMF) may transmit, to the standby AGF 115, an indication that the path has been successfully switched or modified to be associated with the standby AGF 115. As a result, the standby AGF 115 may assume the role of the DHCP relay for the DHCP session associated with the client device 105. For example, the standby AGF 115 may apply the network configuration associated with the DHCP session and/or the other information indicated by the active AGF 110 to enable the standby AGF to serve as the DHCP relay. In some implementations, the standby AGF 115 may transmit, and the client device 105 may receive, an indication of a MAC address associated with the standby AGF 115. For example, the standby AGF 115 may transmit a gratuitous address resolution protocol (ARP) communication or a gratuitous neighbor discovery communication indicating the MAC address associated with the standby AGF 115 (e.g., to enable the client device 105 to communicate with a MAC entity associated with the standby AGF 115). In some other implementations, the standby AGF 115 may not transmit the indication of the MAC address, such as examples where a virtual MAC entity is used that is shared between the standby AGF 115 and the active AGF 110 (e.g., because the client device 105 will already have receive the MAC address of the virtual MAC entity from the active AGF 110).

For example, as shown by reference number 185, the standby AGF 115 may forward one or more data communications (e.g., one or more data packets) between the UPF 125 and the client device 105 associated with the active session via a second path (e.g., the path between the standby AGF 115 and the UPF 125). For example, the network configuration associated with the client device 105 (e.g., the IP address, subscriber identifiers, session information, and/or session transport information) may not change, but a route associated with the data communication(s) may be changed such that the data communications are forwarded to the standby AGF 115 (e.g., rather than the active AGF 110) and to the UPF 125 or the client device 105 by the standby AGF 115.

As a result, signaling required to establish a connection for the client device 105 with the standby AGF 115 after a failure associated with the active AGF 110 may be significantly reduced, thereby conserving network resources and/or processing resources that would have otherwise been used to establish a new DHCP session and/or a new PDU session associated with the client device 105 and the standby AGF 115. Therefore, the active session associated with the client device 105 may be maintained and the client device 105 may experience no, or a minimal, impact (e.g., on data rates or data connectivity) due to the failure of the active AGF 110. Additionally, a delay associated with switching a connection or path for connectivity to the wireless network for the client device 105 from the active AGF 110 to the standby AGF 115 may be reduced. Moreover, the standby AGF 115 may be enabled to quickly detect (e.g., as compared to the client device 105 detecting the failure) the failure associated with the active AGF 110 based on signaling exchanged between the active AGF 110 and the standby AGF 115 (e.g., BFD signaling, VRRP signaling, or other signaling).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
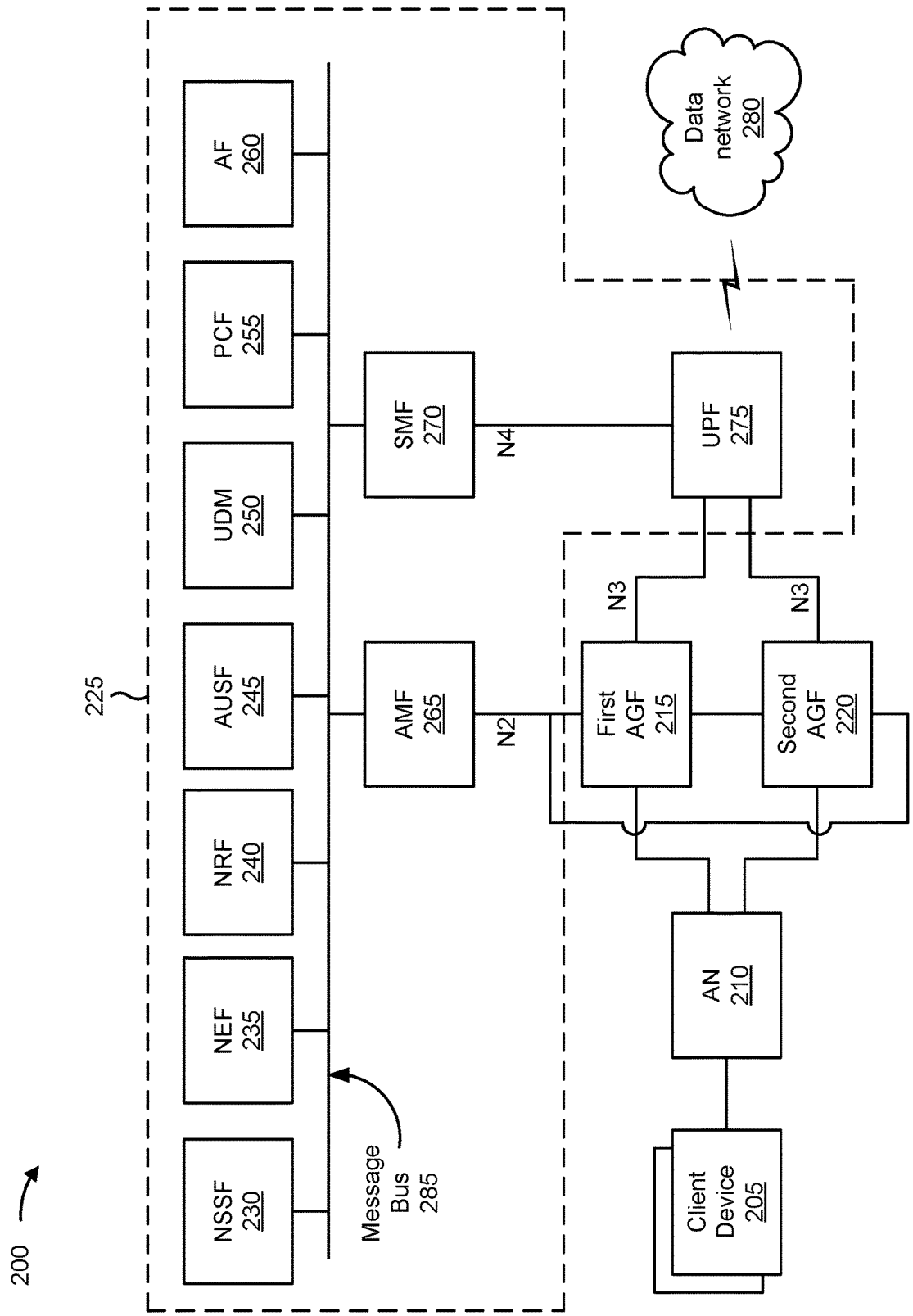
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include client device 205, AN 210, a first AGF 215, a second AGF 220, core network 225, and a data network 280. Devices and/or networks of example environment 200 may interconnect via wired connections, wireless connections, or a combination of wired and wireless connections.

Client device 205 includes one or more devices capable of receiving, generating, storing, processing, and/or providing information, such as information described herein. Client device 205 may be, may be similar to, or may include, the client device 105. Client device 205 may include a residential gateway, a user equipment, a network device (e.g., a label switching router (LSR), a label edge router (LER), an ingress router, an egress router, a provider router, a virtual router, a gateway, a switch, a firewall, a hub, a bridge, a reverse proxy, a proxy server, a cloud server, a data center server, a load balancer, and/or the like), or a similar type of device. The client device 205 may be any device that is capable of communicating via the DHCP (e.g., which may be referred to herein as a DHCP client device). In some implementations, client device 205 may receive network traffic from and/or may provide network traffic to core network 225, via AN 210.

AN 210 may include one or more nodes that are associated with a wireline connection to core network 225. AN 210 may include a central unit (CU) that includes a next generation (NG) interface connecting the CU to a core unit (e.g., a next gen core (NGC) unit), which may be a node of core network 225. AN 210 may transfer traffic between client device 205 and core network 225. In some implementations, AN 210 may perform scheduling and/or resource management for client device 205 covered by AN 210. In some implementations, AN 210 may be controlled or coordinated by a network controller, which may perform load balancing, network-level configuration, and/or the like. A network controller may communicate with AN 210 via a wireless or wireline backhaul. In some implementations, AN 210 may include a network controller, a self-organizing network (SON) module or component, or a similar module or component. In other words, AN 210 may perform network control, scheduling, and/or network management functions (e.g., for uplink, downlink, and/or sidelink communications of client device 205 covered by AN 210).

The first AGF 215 and the second AGF 220 may include one or more devices, between a wireline access infrastructure (e.g., AN 210) and core network 225, that support residential gateways (e.g., client device 205) that support 5G NAS signaling and residential gateways that are purely wireline (e.g., that do not support NAS signaling).

In some implementations, the core network 225 may include an example functional architecture in which systems and/or methods described herein may be implemented. For example, core network 225 may include an example architecture of a 5G NG core network included in a 5G wireless telecommunications system. While the example architecture of core network 225 shown in FIG. 2 may be an example of a service-based architecture, in some implementations, core network 225 may be implemented as a reference-point architecture.

As shown in FIG. 2, core network 225 may include a number of functional elements. The functional elements may include, for example, a network slice selection function (NSSF) 230, a network exposure function (NEF) 235, a network repository function (NRF) 240, an authentication server function (AUSF) 245, a unified data management (UDM) component 250, a policy control function (PCF) 255, an application function (AF) 260, an AMF 265, an SMF 270, and/or a UPF 275, among other examples. These functional elements may be communicatively connected via a message bus 285. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 230 includes one or more devices that select network slice instances for client device 205. By providing network slicing, NSSF 230 allows an operator to deploy multiple substantially independent end-to-end networks potentially with the same infrastructure. In some implementations, each slice may be customized for different services. NEF 235 includes one or more devices that support exposure of capabilities and/or events in the wireless telecommunications system to help other entities in the wireless telecommunications system discover network services. NRF 240 is a central repository for all network functions. NRF 240 may provide a single record of all network functions available in a given network, together with the profile of each and the services network functions support.

AUSF 245 includes one or more devices that act as an authentication server and support the process of authenticating client device 205 in the wireless telecommunications system. UDM 250 includes one or more devices that store user data and profiles in the wireless telecommunications system. UDM 250 may be used for fixed access, mobile access, and/or the like, in core network 225. PCF 255 includes one or more devices that provide a policy framework that incorporates network slicing, roaming, packet processing, mobility management, and/or the like. AF 260 includes one or more devices that support application influence on traffic routing, access to NEF 235, policy control, and/or the like.

AMF 265 includes one or more devices that act as a termination point for NAS signaling, mobility management, and/or the like. SMF 270 includes one or more devices that support the establishment, modification, and release of communications sessions in the wireless telecommunications system. For example, SMF 270 may configure traffic steering policies at UPF 275, enforce user equipment IP address allocation and policies, and/or the like. The control plane core network device(s) 120 may be, or may include, NSSF 230, NEF 235, NRF 240, AUSF 245, UDM 250, PCF 255, AF 260, AMF 265 and/or SMF 270.

UPF 275 includes one or more devices that serve as an anchor point for intra-radio access technology (RAT) and/or inter-RAT mobility. UPF 275 may apply rules to packets, such as rules pertaining to packet routing, traffic reporting, handling user plane QoS, and/or the like.

Message bus 285 represents a communication structure for communication among the functional elements. In other words, message bus 285 may permit communication between two or more functional elements. The message bus 285 may be a logical and/or physical communication structure for communication among the functional elements. Accordingly, the message bus 285 may permit communication between two or more functional elements, whether logically (e.g., using one or more application programming interfaces (APIs), among other examples) and/or physically (e.g., using one or more wired and/or wireless connections).

Data network 280 includes one or more wired and/or wireless data networks. For example, data network 280 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
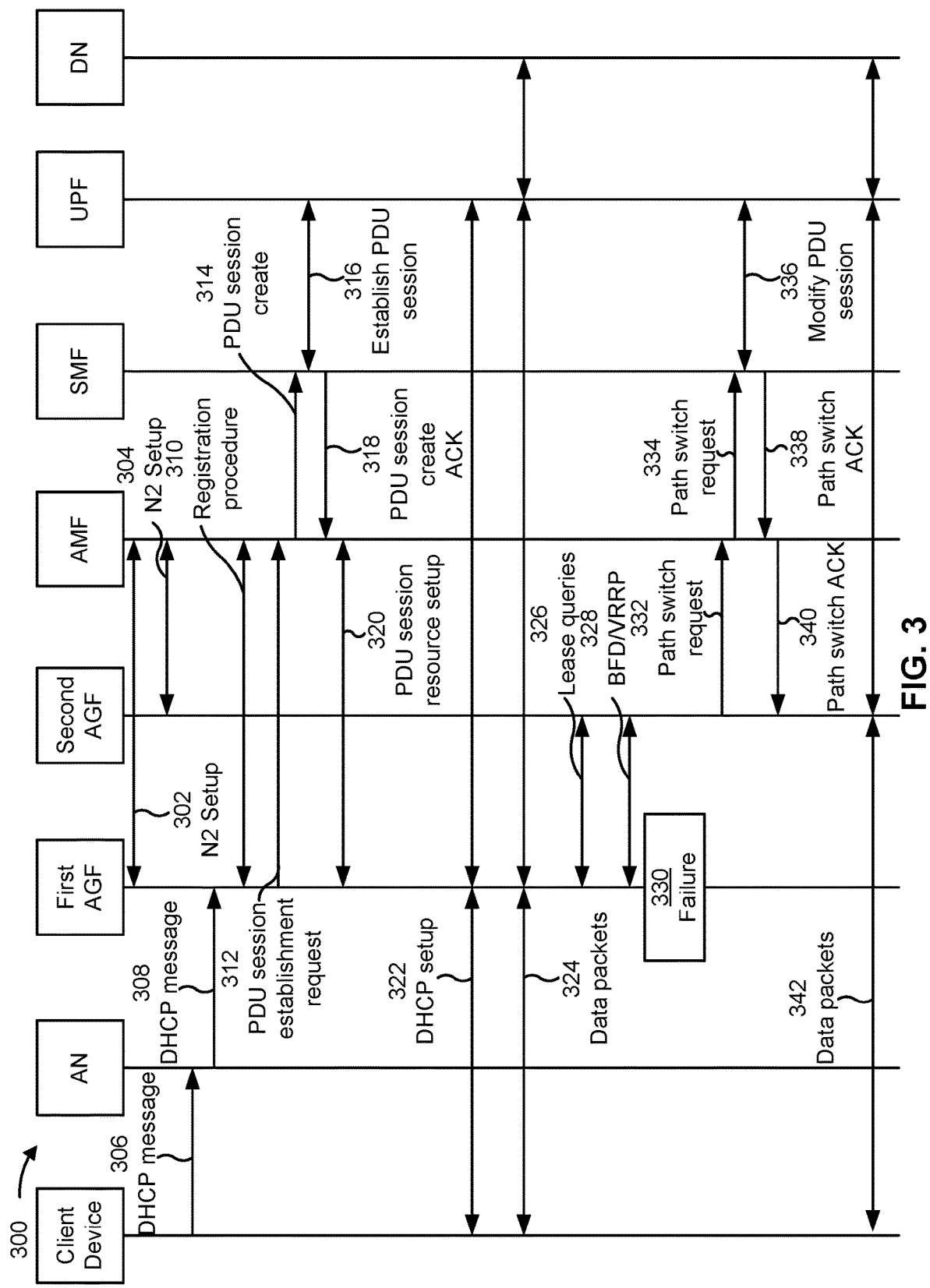
FIG. 3 is a diagram of an example implementation described herein.

FIG. 3 is a diagram of an example implementation 300 associated with standby AGF signaling for a DHCP. As shown in FIG. 3, example implementation 300 includes client device (e.g., the client device 105 and/or the client device 205), an AN (e.g., the AN 210), a first AGF (e.g., the first AGF 215 and/or the active AGF 110), a second AGF (e.g., the second AGF 220 and/or the standby AGF 115), an AMF (e.g., the AMF 265), an SMF (e.g., the SMF 270), a UPF (e.g., the UPF 275 and/or the UPF 125), and a data network (DN) (e.g., the data network 280). These devices are described in more detail below in connection with FIGS. 2, 4, and 5.

As shown by reference number 302, the first AGF and the AMF may communicate to establish an N2 interface. Similarly, as shown by reference number 304, the second AGF and the AMF may communicate to establish the N2 interface. For example, the first AMF and the second AMF may communicate with the AMF to establish a network connection with a core network.

As shown by reference number 306, the client device may transmit, and the AN may receive, a DHCP message. The DHCP message may be a request to establish a DHCP session. For example, the DHCP message may be DHCP discover message (e.g., associated with DHCPv4), a DHCP solicit message (e.g., associated with DHCPv6), or a similar type of DHCP message. As shown by reference number 308, the AN may transmit, and the first AGF may receive, the DHCP message. In other words, the AN may forward the DHCP message from the client device to the first AGF.

As shown by reference number 310, the first AGF may perform a registration procedure with the AMF based on receiving the DHCP message. For example, the registration procedure may be a DHCP device registration procedure. As shown by reference number 312, the first AGF may transmit, and the AMF may receive, a PDU session establishment request (e.g., via the N2 interface). For example, the first AGF may request a PDU session to be established based on receiving the DHCP message that is transmitted by the client device.

As shown by reference number 314, the AMF may transmit, and the SMF may receive, a PDU session create communication (e.g., a PDU session create packet). For example, based on receiving the PDU session establishment request, the AMF may communicate with the SMF to cause the PDU session associated with the first AGF to be established. As shown by reference number 316, the SMF may generate or establish the PDU session and communicate with the UPF to indicate the PDU session. As shown by reference number 318, based on successfully establishing the PDU session with the UPF, the SMF may transmit, and the AMF may receive, a PDU session create ACK message indicating that the PDU session has been successfully established. As shown by reference number 320, the first AGF and the AMF may communicate with perform PDU session resource setup. For example, the first AGF and the AMF may communicate to establish session information, network resources, and/or network functions to be associated with the PDU session.

As shown by reference number 322, the client device and the UPF may exchange one or more communications perform a DHCP session setup. For example, the UPF may transmit (e.g., via the first AGF and/or the AN), and the client device may receive, a DHCP offer message (e.g., associated with DHCPv4), a DHCP advertise message (e.g., associated with DHCPv6), or a similar DHCP communication indicating that the UPF is available to serve as a DHCP server. The client device may transmit (e.g., via the AN and/or the first AGF), and the UPF may receive, a DHCP request communication requesting to establish a DHCP session with the UPF. The UPF may generate network configuration information and/or DHCP binding information to be associated with the DHCP session based on receiving the DHCP request communication. The UPF may transmit (e.g., via the first AGF and/or the AN), and the client device may receive, a DHCP request ACK communication indicating the network configuration information and/or DHCP binding information and that the DHCP session has been successfully established.

In some implementations, the first AGF and the client device may exchange one or more ARP messages (e.g., an ARP request and/or an ARP response) to establish a gateway IP address associated with a routing path for data packets associated with the client device. As shown by reference number 324, one or more data packets may be routed between the data network and the client device (e.g., via the UPF, the first AGF, and the AN) based on establishing the PDU session and the DHCP session. For example, the first AGF may forward the one or more data packets (e.g., as a DHCP relay) between the client device and the UPF (e.g., the DHCP server).

As shown by reference number 326, the first AGF and the second AGF may exchange one or more lease query communications (e.g., ALQ and/or BLQ communications). A lease query communication transmitted by the first AGF and received by the second AGF may indicate DHCP binding information associated with the client device. Additionally, as explained in more detail in connection with FIGS. 1A-1C, the lease query communication may indicate information to enable the second AGF to switch a path (e.g., an N3 interface path) from the first AGF to the second AGF for the DHCP session associated with the client device. For example, the lease query communication may include an indication of a SUPI, a SUCI, a GUTI, and/or a PDU session identifier, among other examples, associated with the active session (e.g., the PDU session and/or the DHCP session) between the first AGF and the client device. Additionally, or alternatively, the lease query communication may include an indication of a GUAMI, an AMF UE NGAP identifier, a RAN UE GAP identifier, and/or UE context information (e.g., PDU session information associated with the PDU session and/or GTP information associated with the PDU session), among other examples, associated with the active session (e.g., the PDU session and/or the DHCP session) between the first AGF and the client device.

As shown by reference number 328, the first AGF and the second AGF exchange (e.g., via a TCP interface) one or more VRRP communications and/or one or more BFD communications to facilitate a detection of a failure associated with the first AGF by the second AGF. For example, the second AGF may detect a failure associated with the first AGF based on not receiving a VRRP reply and/or a BFD reply communication within a certain amount of time. As shown by reference number 330, the first AGF may experience a failure that causes the first AGF to be unable to forward or route data packets associated with the client device. The second AGF may detect that failure as described in more detail elsewhere herein.

As shown by reference number 332, based on detecting the failure, the second AGF may transmit, and the AMF may receive, a path switch request associated with the PDU session and/or the DHCP session of the client device. The path switch request may be an NGAP path switch request. In some implementations, the path switch request may be a request to modify an N3 interface path associated with the PDU session and/or the DHCP session of the client device. The path switch request may indicate the information provided by the first AGF in the lease query communication. For example, the path switch request may indicate an indication of a SUPI, a SUCI, a GUTI, and/or a PDU session identifier, among other examples, associated with the active session (e.g., the PDU session and/or the DHCP session) between the first AGF and the client device. Additionally, or alternatively, the lease query communication may include an indication of a GUAMI, an AMF UE NGAP identifier, a RAN UE GAP identifier, and/or UE context information (e.g., PDU session information associated with the PDU session and/or GTP information associated with the PDU session), among other examples, associated with the active session (e.g., the PDU session and/or the DHCP session) between the first AGF and the client device. This may enable the AMF, the SMF, and/or other core network devices to identify the subscriber (e.g., the client device), the DHCP session, and/or the PDU session.

As shown by reference number 334, the AMF may transmit, and the SMF may receive, a path switch request. For example, based on receiving the path switch request from the second AGF, the AMF may request the SMF to switch the path (e.g., the N3 interface path) associated with the PDU session and/or the DHCP session to the second AGF. As shown by reference number 336, the SMF and/or the UPF may modify the path to be associated with the second AGF (e.g., based on receiving the path switch request). For example, the SMF and/or the UPF may modify information stored by the core network associated with the PDU session and/or the DHCP session to modify the path to be associated with the second AGF (e.g., rather than the first AGF). As shown by reference number 338, based on successfully modifying the PDU session and/or the DHCP session to switch the path (e.g., the N3 path) to the second AGF, the SMF may transmit, and the AMF may receive a path switch ACK message indicating that the path has been successfully switched as requested. As shown by reference number 340, the AMF may transmit, and the second AGF may receive, a path switch ACK message indicating that the path has been successfully switched as requested.

In some implementations, the second AGF may transmit, and the client device may receive, an indication of a MAC address associated with the second AGF. For example, the second AGF may transmit a gratuitous ARP communication or a gratuitous neighbor discovery communication indicating the MAC address associated with the second AGF (e.g., to enable the client device to communicate with a MAC entity associated with the second AGF). In some other implementations, the second AGF may not transmit the indication of the MAC address, such as examples where a virtual MAC entity is used that is shared between the first AGF and the second AGF.

As shown by reference number 342, one or more data packets may be routed between the data network and the client device (e.g., via the UPF, the second AGF, and the AN) based on switching the path and modifying the PDU session, as described above. For example, the second AGF may forward the one or more data packets (e.g., as a DHCP relay) between the client device and the UPF (e.g., the DHCP server). As shown in FIG. 3, a recovery of a failure associated with the first AGF may be resolved quickly and efficiently based on the first AGF providing the information to the second AGF to enable the second AGF to cause a path from the UPF (e.g., an N3 interface path) to be switch from the first AGF to the second AGF. For example, rather than requiring a new PDU session and a new DHCP session to be established (e.g., using similar signaling as described in connection with reference numbers 312, 314, 316, 318, 320, and 322), the second AGF may assume the role of the DHCP relay via a path switch procedure (e.g., an NGAP path switch procedure). This may conserve processing resources and/or network resources that would have otherwise been used to communicate similar signaling as described in connection with reference numbers 312, 314, 316, 318, 320, and 322 to establish a new PDU session and/or a new DHCP session associated with the second AGF and the client device. Additionally, this may enable the PDU session and the DHCP session to be maintained, reducing an impact of the failure of the first AGF on the client device.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
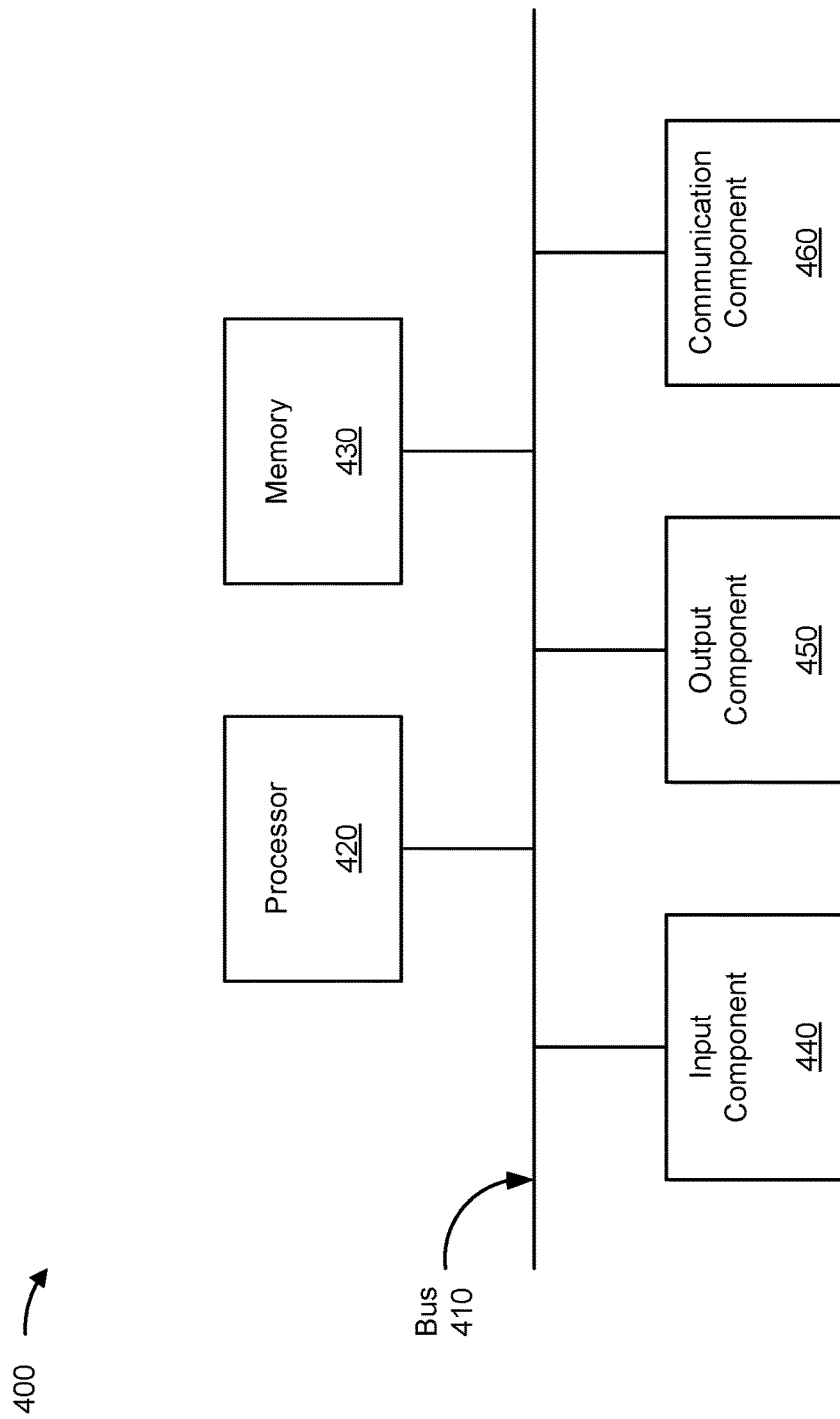
FIGS. 4 and 5 is a diagram of example components of one or more devices of FIG. 2.

FIG. 4 is a diagram of example components of a device 400, which may correspond to the client device 105, the active AGF 110, the standby AGF 115, the control plane core network device(s) 120, the UPF 125, the client device 205, the AN 210, the first AGF 215, the second AGF 220, the NSSF 230, the NEF 235, the NRF 240, the AUSF 245, the UDM 250, the PCF 255, the AF 260, the AMF 265, the SMF 270, and/or the UPF 275, among other examples. In some implementations, the client device 105, the active AGF 110, the standby AGF 115, the control plane core network device(s) 120, the UPF 125, the client device 205, the AN 210, the first AGF 215, the second AGF 220, the NSSF 230, the NEF 235, the NRF 240, the AUSF 245, the UDM 250, the PCF 255, the AF 260, the AMF 265, the SMF 270, and/or the UPF 275 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
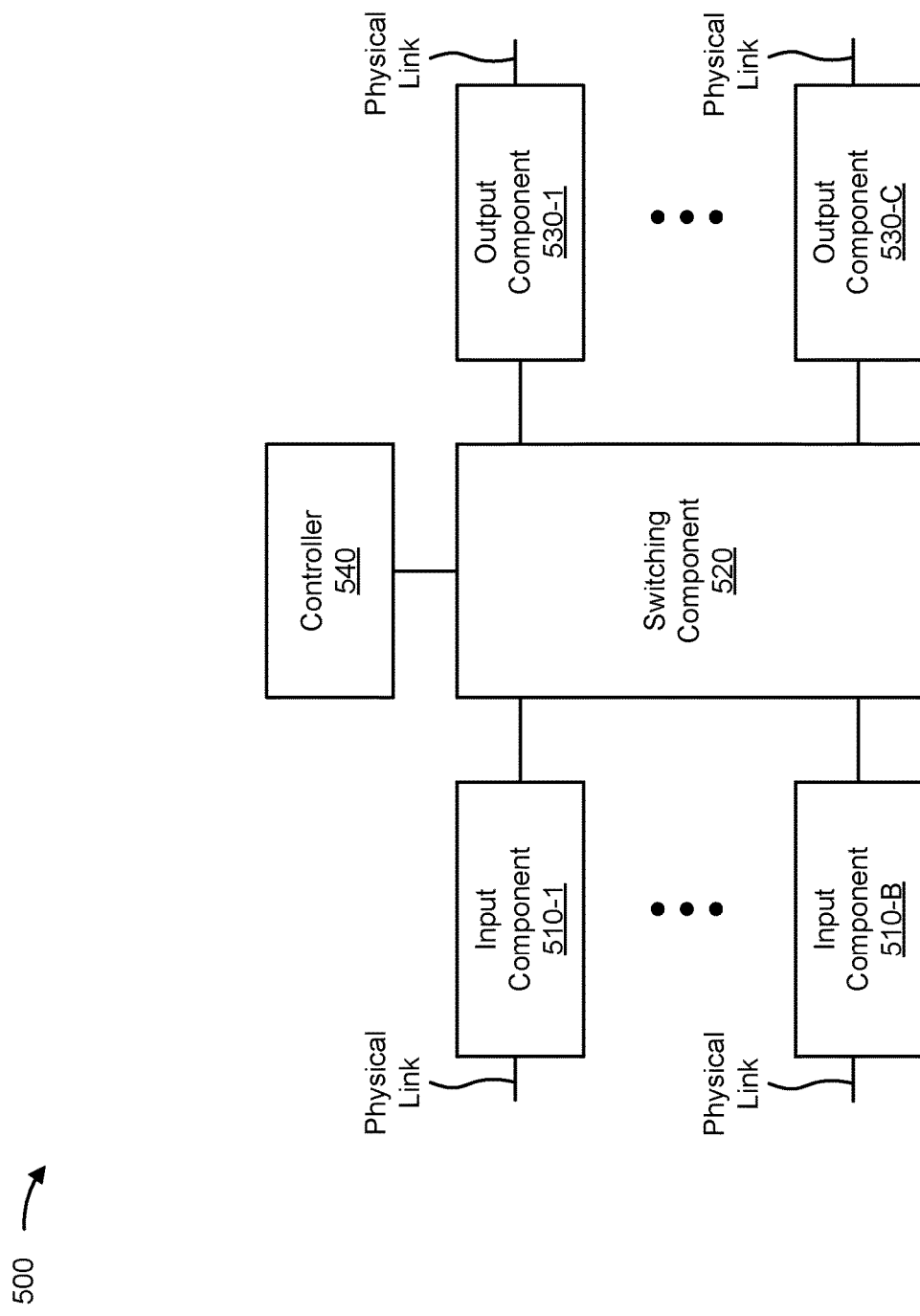

FIG. 5 is a diagram of example components of a device 500. Device 500 may correspond to the client device 105, the active AGF 110, the standby AGF 115, the control plane core network device(s) 120, the UPF 125, the client device 205, the AN 210, the first AGF 215, the second AGF 220, the NSSF 230, the NEF 235, the NRF 240, the AUSF 245, the UDM 250, the PCF 255, the AF 260, the AMF 265, the SMF 270, and/or the UPF 275, among other examples. In some implementations, the client device 105, the active AGF 110, the standby AGF 115, the control plane core network device(s) 120, the UPF 125, the client device 205, the AN 210, the first AGF 215, the second AGF 220, the NSSF 230, the NEF 235, the NRF 240, the AUSF 245, the UDM 250, the PCF 255, the AF 260, the AMF 265, the SMF 270, and/or the UPF 275, may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
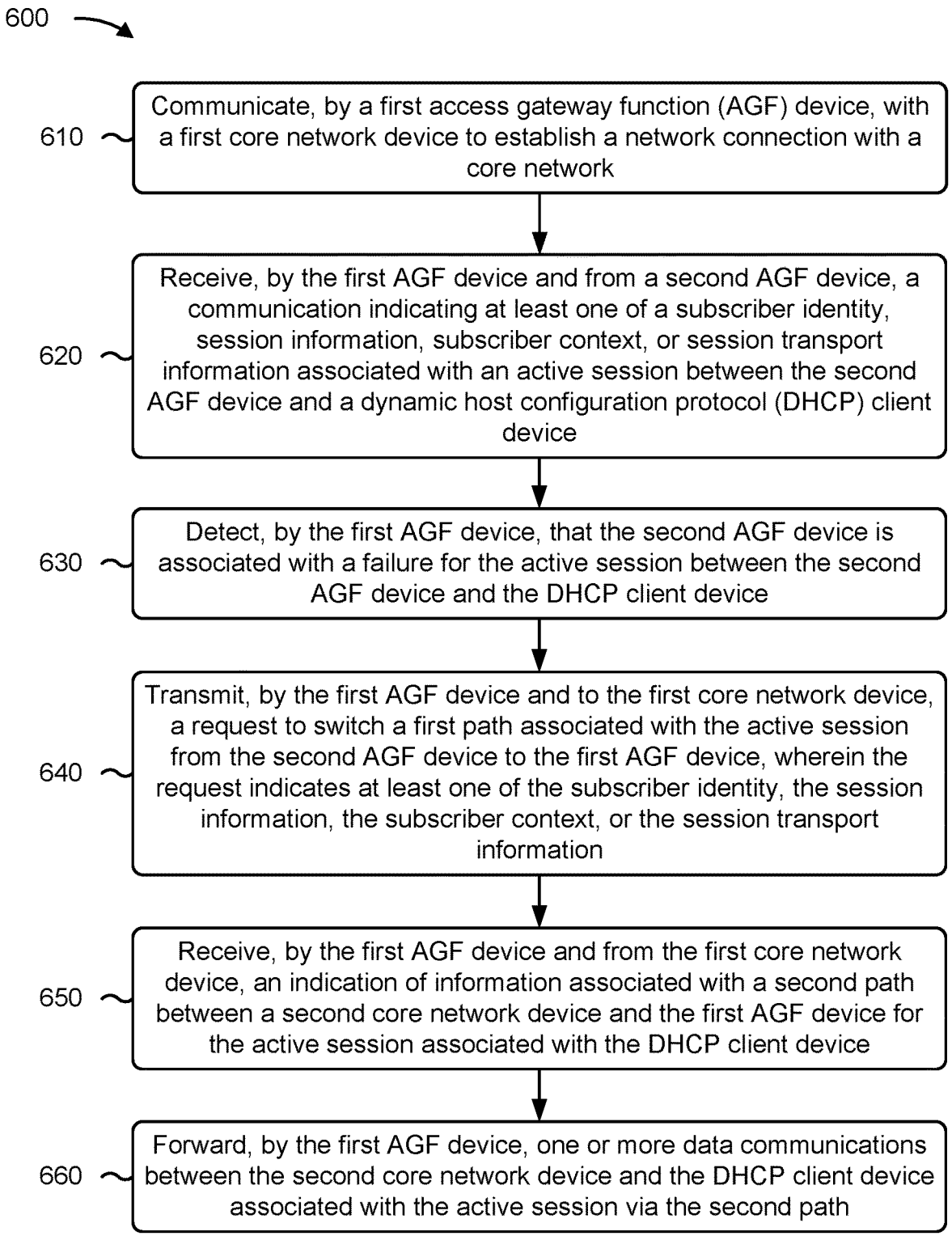
FIGS. 6 and 7 are flowcharts of example processes relating to standby access gateway function (AGF) signaling for a dynamic host configuration protocol (DHCP).

FIG. 6 is a flowchart of an example process 600 associated with standby AGF signaling for a DHCP. In some implementations, one or more process blocks of FIG. 6 are performed by a first AGF device (e.g., the standby AGF 115 or the second AGF 220). In some implementations, one or more process blocks of FIG. 6 are performed by another device or a group of devices separate from or including the first AGF device, such as the client device 105, the active AGF 110, the control plane core network device(s) 120, the UPF 125, the client device 205, the AN 210, the first AGF 215, the NSSF 230, the NEF 235, the NRF 240, the AUSF 245, the UDM 250, the PCF 255, the AF 260, the AMF 265, the SMF 270, and/or the UPF 275, among other examples. Additionally, or alternatively, one or more process blocks of FIG. 6 may be performed by one or more components of device 400, such as processor 420, memory 430, input component 440, output component 450, and/or communication component 460. Additionally, or alternatively, one or more process blocks of FIG. 6 may be performed by one or more components of device 500, such as input component 510, switching component 520, output component 530, and/or controller 540.

As shown in FIG. 6, process 600 may include communicating with a first core network device to establish a network connection with a core network (block 610). For example, the first AGF device may communicate with a first core network device to establish a network connection with a core network, as described above.

As further shown in FIG. 6, process 600 may include receiving, from a second AGF device, a communication indicating at least one of a subscriber identity, session information, subscriber context, or session transport information associated with an active session between the second AGF device and a DHCP client device (block 620). For example, the first AGF device may receive, from a second AGF device, a communication indicating at least one of a subscriber identity, session information, subscriber context, or session transport information associated with an active session between the second AGF device and a DHCP client device, as described above.

As further shown in FIG. 6, process 600 may include detecting that the second AGF device is associated with a failure for the active session between the second AGF device and the DHCP client device (block 630). For example, the first AGF device may detect that the second AGF device is associated with a failure for the active session between the second AGF device and the DHCP client device, as described above.

As further shown in FIG. 6, process 600 may include transmitting, to the first core network device, a request to switch a first path associated with the active session from the second AGF device to the first AGF device, wherein the request indicates at least one of the subscriber identity, the session information, the subscriber context, or the session transport information (block 640). For example, the first AGF device may transmit, to the first core network device, a request to switch a first path associated with the active session from the second AGF device to the first AGF device, wherein the request indicates at least one of the subscriber identity, the session information, the subscriber context, or the session transport information, as described above.

As further shown in FIG. 6, process 600 may include receiving, from the first core network device, an indication of information associated with a second path between a second core network device and the first AGF device for the active session associated with the DHCP client device (block 650). For example, the first AGF device may receive, from the first core network device, an indication of information associated with a second path between a second core network device and the first AGF device for the active session associated with the DHCP client device, as described above.

As further shown in FIG. 6, process 600 may include forwarding one or more data communications between the second core network device and the DHCP client device associated with the active session via the second path (block 660). For example, the first AGF device may forward one or more data communications between the second core network device and the DHCP client device associated with the active session via the second path, as described above.

Process 600 may include additional implementations, such as any single implementation or any combination of implementations described below and/or in connection with one or more other processes described elsewhere herein.

In a first implementation, the communication is a lease query communication.

In a second implementation, alone or in combination with the first implementation, the communication includes an indication of at least one of NAS information associated with the active session or NGAP information associated with the active session.

In a third implementation, alone or in combination with one or more of the first and second implementations, the subscriber identity, the session information, the subscriber context, or the session transport information includes an indication of at least one of a SUPI associated with the DHCP client device and the active session, a SUCI associated with the DHCP client device and the active session, a GUTI associated with the DHCP client device and the active session, or a PDU session identifier associated with the active session.

In a fourth implementation, alone or in combination with one or more of the first through third implementations, the subscriber identity, the session information, the subscriber context, or the session transport information includes an indication of at least one of a GUAMI associated with the active session, an AMF UE NGAP identifier associated with the active session, a RAN UE NGAP identifier associated with the active session, or UE context information associated with the active session.

In a fifth implementation, alone or in combination with one or more of the first through fourth implementations, the communication includes an indication of DHCP binding information associated with the active session.

In a sixth implementation, alone or in combination with one or more of the first through fifth implementations, process 600 includes transmitting, to the DHCP client device, an indication of MAC address information associated with the first AGF device.

In a seventh implementation, alone or in combination with one or more of the first through sixth implementations, the first core network device is a control plane core network device, and the second core network device is a user plane core network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
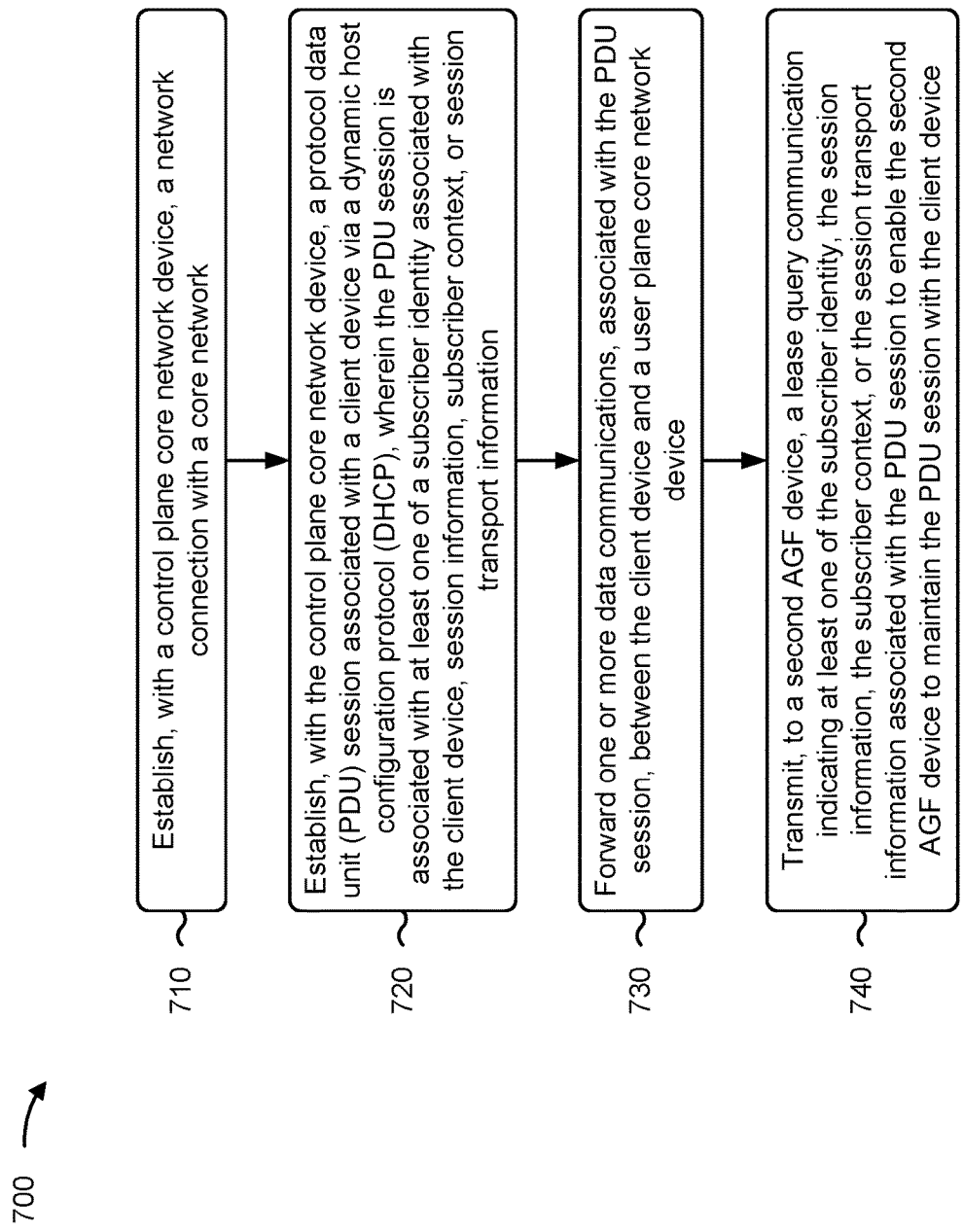

FIG. 7 is a flowchart of an example process 700 associated with standby AGF signaling for a DHCP. In some implementations, one or more process blocks of FIG. 7 are performed by a first AGF device (e.g., the active AGF 110 and/or the first AGF 215). In some implementations, one or more process blocks of FIG. 7 are performed by another device or a group of devices separate from or including the first AGF device, such as the client device 105, the standby AGF 115, the control plane core network device(s) 120, the UPF 125, the client device 205, the AN 210, the second AGF 220, the NSSF 230, the NEF 235, the NRF 240, the AUSF 245, the UDM 250, the PCF 255, the AF 260, the AMF 265, the SMF 270, and/or the UPF 275, among other examples. Additionally, or alternatively, one or more process blocks of FIG. 7 may be performed by one or more components of device 400, such as processor 420, memory 430, input component 440, output component 450, and/or communication component 460. Additionally, or alternatively, one or more process blocks of FIG. 7 may be performed by one or more components of device 500, such as input component 510, switching component 520, output component 530, and/or controller 540.

As shown in FIG. 7, process 700 may include establishing, with a control plane core network device, a network connection with a core network (block 710). For example, the first AGF device may establish, with a control plane core network device, a network connection with a core network, as described above.

As further shown in FIG. 7, process 700 may include establishing, with the control plane core network device, a PDU session associated with a client device via a DHCP, wherein the PDU session is associated with at least one of a subscriber identity associated with the client device, subscriber context, session information, or session transport information (block 720). For example, the first AGF device may establish, with the control plane core network device, PDU session associated with a client device via a DHCP, wherein the PDU session is associated with at least one of a subscriber identity associated with the client device, session information, subscriber context, or session transport information, as described above.

As further shown in FIG. 7, process 700 may include forwarding one or more data communications, associated with the PDU session, between the client device and a user plane core network device (block 730). For example, the first AGF device may forward one or more data communications, associated with the PDU session, between the client device and a user plane core network device, as described above.

As further shown in FIG. 7, process 700 may include transmitting, to a second AGF device, a lease query communication indicating at least one of the subscriber identity, the session information, the subscriber context, or the session transport information associated with the PDU session to enable the second AGF device to maintain the PDU session with the client device (block 740). For example, the first AGF device may transmit, to a second AGF device, a lease query communication indicating at least one of the subscriber identity, the session information, the subscriber context, or the session transport information associated with the PDU session to enable the second AGF device to maintain the PDU session with the client device, as described above. For example, the lease query communication may enable the second AGF device to maintain a data structure indicating information associated with the PDU session (e.g., may enable the second AGF device to maintain a database, a list, and/or another data structure indicating PDU session information related to one or more client devices, including the client device).

Process 700 may include additional implementations, such as any single implementation or any combination of implementations described below and/or in connection with one or more other processes described elsewhere herein.

In a first implementation, the lease query communication includes at least one of an ALQ communication, an individual lease query communication, or a BLQ communication.

In a second implementation, alone or in combination with the first implementation, the lease query communication includes an indication of at least one of NAS information associated with the PDU session or NGAP information associated with the PDU session.

In a third implementation, alone or in combination with one or more of the first and second implementations, the subscriber identity, the session information, the subscriber context, or the session transport information includes an indication of at least one of a SUPI associated with the client device and the PDU session, a SUCI associated with the client device and the PDU session, a GUTI associated with the client device and the PDU session, or a PDU session identifier associated with the PDU session.

In a fourth implementation, alone or in combination with one or more of the first through third implementations, the subscriber identity, the session information, the subscriber context, or the session transport information includes an indication of at least one of a GUAMI associated with the PDU session, an AMF UE NGAP identifier associated with the PDU session, a RAN UE NGAP identifier associated with the PDU session, PDU session information associated with the PDU session, or GTP information associated with the PDU session.

In a fifth implementation, alone or in combination with one or more of the first through fourth implementations, the lease query communication includes an indication of DHCP binding information associated with the PDU session.

In a sixth implementation, alone or in combination with one or more of the first through fifth implementations, process 700 includes transmitting, to the second AGF device, one or more VRRP communications or one or more BFD communications to facilitate a detection of a failure associated with the first AGF device associated with the PDU session.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a PDU, a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   communicating, by a first access gateway function (AGF) device, with a first core network device to establish a network connection with a core network;
   receiving, by the first AGF device and from a second AGF device, a communication indicating at least one of a subscriber identity, session information, subscriber context, or session transport information associated with an active session between the second AGF device and a dynamic host configuration protocol (DHCP) client device;
   detecting, by the first AGF device, that the second AGF device is associated with a failure for the active session between the second AGF device and the DHCP client device;
   transmitting, by the first AGF device and to the first core network device, a request to switch a first path associated with the active session from the second AGF device to the first AGF device, wherein the request indicates at least one of the subscriber identity, the session information, the subscriber context, or the session transport information;
   receiving, by the first AGF device and from the first core network device, an indication of information associated with a second path between a second core network device and the first AGF device for the active session associated with the DHCP client device; and forwarding, by the first AGF device, one or more data communications between the second core network device and the DHCP client device associated with the active session via the second path.

2. The method of claim 1, wherein the communication is a lease query communication.

3. The method of claim 1, wherein the communication includes an indication of at least one of non-access stratum (NAS) information associated with the active session or next generation application protocol (NGAP) information associated with the active session.

4. The method of claim 1, wherein the subscriber identity, the session information, the subscriber context, or the session transport information includes an indication of at least one of:
   a subscriber unique permanent identifier (SUPI) associated with the DHCP client device and the active session, a subscriber unique concealed identifier (SUCI) associated with the DHCP client device and the active session, a global unique temporary identifier (GUTI) associated with the DHCP client device and the active session, or
   a protocol data unit (PDU) session identifier associated with the active session.

5. The method of claim 1, wherein the subscriber identity, the session information, the subscriber context, or the session transport information includes an indication of at least one of:
   a global unique access and mobility function (AMF) identifier (GUAMI) associated with the active session, an AMF user equipment (UE) next generation application protocol (NGAP) identifier associated with the active session, a radio access network (RAN) UE NGAP identifier associated with the active session, or
   UE context information associated with the active session.

6. The method of claim 1, wherein the communication includes an indication of DHCP binding information associated with the active session.

7. The method of claim 1, further comprising:
   transmitting, to the DHCP client device, an indication of medium access control (MAC) address information associated with the first AGF device.

8. The method of claim 1, wherein the first core network device is a control plane core network device and the second core network device is a user plane core network device.

9. A non-transitory computer-readable medium storing a set of instructions, the set of instructions comprising:
   one or more instructions that, when executed by one or more processors of a first access gateway function (AGF) device, cause the first AGF device to:
      communicate with a control plane core network device to establish a network connection with a core network;
      receive, from a second AGF device, a lease query communication indicating at least one of a subscriber identity, session information, subscriber context, or session transport information associated with a protocol data unit (PDU) session between the second AGF device and a client device;
      detect that the second AGF device has experienced a failure associated with the PDU session;
      transmit, to the control plane core network device, a request to switch the PDU session from the second AGF device to the first AGF device, wherein the request indicates at least one of the subscriber identity, the session information, the subscriber context, or the session transport information;
      receive, from the control plane core network device, an indication of information associated with a path between a user plane core network device and the first AGF device for the PDU session associated with the client device; and
      forward one or more data communications between the user plane core network device and the client device associated with the PDU session via the path.

10. The non-transitory computer-readable medium of claim 9, wherein the lease query communication includes an indication of at least one of non-access stratum (NAS) information associated with the PDU session or next generation application protocol (NGAP) information associated with the PDU session.

11. The non-transitory computer-readable medium of claim 9, wherein the subscriber identity, the session information, the subscriber context, or the session transport information includes an indication of at least one of:
   a subscriber unique permanent identifier (SUPI) associated with the client device and the PDU session, a subscriber unique concealed identifier (SUCI) associated with the client device and the PDU session, a global unique temporary identifier (GUTI) associated with the client device and the PDU session, or
   a PDU session identifier associated with the PDU session.

12. The non-transitory computer-readable medium of claim 9, wherein the subscriber identity, the session information, the subscriber context, or the session transport information includes an indication of at least one of:
   a global unique access and mobility function (AMF) identifier (GUAMI) associated with the PDU session, an AMF user equipment (UE) next generation application protocol (NGAP) identifier associated with the PDU session,
   a radio access network (RAN) UE NGAP identifier associated with the PDU session, or
   UE context information associated with the PDU session.

13. The non-transitory computer-readable medium of claim 9, wherein the one or more instructions, that cause the first AGF device to detect that the second AGF device has experienced the failure associated with the PDU session, cause the first AGF device to:
   detect that the second AGF device has experienced the failure based on performing a virtual router redundancy protocol (VRRP) procedure or a bidirectional forwarding detection (BFD) procedure with the second AGF device.

* * * * *